UNITED STATES PATENT OFFICE.

HEINRICH BAUM, OF HÖCHST-ON-THE-MAIN, GERMANY, ASSIGNOR TO FARB-WERKE, VORMALS MEISTER, LUCIUS & BRÜNING, OF SAME PLACE.

MANUFACTURE OF CRIMSON COLORING-MATTER.

SPECIFICATION forming part of Letters Patent No. 250,038, dated November 22, 1881.

Application filed December 20, 1880. (Specimens.)

*To all whom it may concern:*

Be it known that I, HEINRICH BAUM, of Höchst-on-the-Main, Germany, have invented a new and useful Improvement in the Manufacture of a New Crimson Coloring-Matter, of which the following is a full, clear, and exact description.

My invention consists in manufacturing a crimson coloring-matter from the disulpho-beta naphtholic sodium salt insoluble in alcohol by means of a diazo compound derived from amido-paracresolmethylic ether.

To produce the disulpho-beta-naphtholic acid one part of the beta-naphthol is mixed with three parts of sulphuric acid, the mixture being heated for twelve hours, at a temperature of 202° to 230° Fahrenheit. Two isomere disulpho-beta-naphtholic acids are thereby obtained, from which the soda salts are easily separated by being digested with three or four parts of alcohol, the salt that is insoluble in alcohol being filtered and dried, while the soluble salt is extracted by evaporation and dried.

To obtain the coloring-matter, seven and one-half parts of amido-paracresolmethylic ether are dissolved in twelve parts of muriatic acid (specific gravity 1′ 16 to 1′ 18) and one hundred parts of water, to which are added four and one-half parts of pure nitrite of potash. This solution is poured into twenty pounds of the above-described disulpho-beta-naphtholic natrium salt dissolved in two hundred parts of water and ten parts of ammonia, (10 per cent.,) when the coloring-matter precipitates in form of a paste. This latter is dissolved, the coloring-matter precipitated with common salt, and a powder is thereby obtained which is dried, and which will give to wool and silk a deep crimson shade that will stand light and soaping.

My coloring-matter dissolves in sulphuric acid with a dirty-red violet color.

By treating my coloring-matter with tin and muriatic acid a yellowish-white precipitate of beta-amido-naphthol disulpho-acid is obtained, and from the solution the amido-paracresolmethyl ether which had been used can be obtained by neutralizing the solution with soda-lye and distilling by steam.

I do not limit myself to the exact proportions, as they may be varied without departing from the principle of my invention.

What I claim as new, and desire to secure by Letters Patent, is—

1. As a new article of manufacture, the crimson coloring-matter having the characteristic herein described.

2. The within-described process for producing a crimson coloring-matter by the action of disulpho-beta-naphtholic sodium salt insoluble in alcohol on the diazoic derivative of amido-paracresolmethylic ether, substantially as set forth.

In testimony whereof I have signed my name to this specification in the presence of two subscribing witnesses.

HEINRICH BAUM.

Witnesses:
JOSEPH PATRICK,
W. HAUFF.